(12) United States Patent
Ferry (10) Patent No.: US 12,042,675 B2
(45) Date of Patent: Jul. 23, 2024

(54) SPEECH DIAPHRAGM MODULE FOR A RESPIRATOR MASK

(71) Applicant: AVON POLYMER PRODUCTS LIMITED, Melksham (GB)

(72) Inventor: Christopher Andrew Ferry, Melksham (GB)

(73) Assignee: Avon Polymer Products Limited, Melksham (GB)

(*) Notice: Subject to any disclaimer, the term of this patent is extended or adjusted under 35 U.S.C. 154(b) by 1438 days.

(21) Appl. No.: 16/426,643

(22) Filed: May 30, 2019

(65) Prior Publication Data

US 2019/0366133 A1  Dec. 5, 2019

(30) Foreign Application Priority Data

Jun. 1, 2018 (GB) ...................................... 1808993

(51) Int. Cl.
*A62B 18/08* (2006.01)
*B29C 65/08* (2006.01)
(Continued)

(52) U.S. Cl.
CPC .............. *A62B 18/08* (2013.01); *B29C 65/08* (2013.01); *G10K 11/18* (2013.01); *G10K 13/00* (2013.01);
(Continued)

(58) Field of Classification Search
CPC .... A62B 7/00; A62B 7/10; A62B 9/00; A62B 18/00; A62B 18/02; A62B 18/025;
(Continued)

(56) References Cited

U.S. PATENT DOCUMENTS

| 2,586,851 | A | * | 2/1952 | Monro | ................... | A62B 18/08 |
| | | | | | | 128/201.15 |
| 3,124,130 | A | * | 3/1964 | Klinger | .................. | A62B 18/08 |
| | | | | | | 128/201.19 |

(Continued)

FOREIGN PATENT DOCUMENTS

| ES | 2021978 A6 | 11/1991 | |
| GB | 2264648 A | * 9/1993 | ............. A62B 18/08 |

(Continued)

OTHER PUBLICATIONS

European Examination Report mailed Feb. 9, 2023, issued in corresponding European Application No. EP 19170991, 7 pages.

(Continued)

*Primary Examiner* — Colin W Stuart
(74) *Attorney, Agent, or Firm* — Christensen O'Connor Johnson Kindness PLLC (57) ABSTRACT

Various embodiments provide a speech diaphragm module including: a body; a lid secured to the body to form an enclosed volume therein; a resilient film secured within the enclosed volume along an attachment joint formed around a periphery of the resilient film; and a tensioning feature arranged to displace an operative portion of the resilient film relative to the attachment joint to apply a tension across the resilient film. The attachment joint can be a solid state weld joint between the resilient film and the body to apply an initial tension across the resilient film, and the tension applied by the tensioning feature can be greater than the initial tension applied by the attachment joint. Some other embodiments provide a method of manufacturing a speech diaphragm module, a respirator, and a kit of parts for forming a speech diaphragm module.

16 Claims, 5 Drawing Sheets

(51) Int. Cl.
  *G10K 11/18* (2006.01)
  *G10K 13/00* (2006.01)
  *B29K 667/00* (2006.01)
  *B29L 31/48* (2006.01)
(52) U.S. Cl.
  CPC . *B29K 2667/003* (2013.01); *B29L 2031/4835* (2013.01)
(58) Field of Classification Search
  CPC ........ A62B 18/04; A62B 18/08; G10K 11/18; G10K 13/00
  USPC .................................................... 128/201.19
  See application file for complete search history.

(56) References Cited

U.S. PATENT DOCUMENTS

| | | | |
|---|---|---|---|
| 4,915,099 A | | 4/1990 | Davis |
| 6,016,802 A | * | 1/2000 | Jackson .................. A62B 9/02 |
| | | | 128/205.24 |
| 6,305,370 B1 | | 10/2001 | Rosert et al. |
| 2013/0263848 A1 | * | 10/2013 | Feil ........................ A62B 18/08 |
| | | | 128/201.19 |
| 2016/0001109 A1 | | 1/2016 | Kanno et al. |

FOREIGN PATENT DOCUMENTS

| | | | | |
|---|---|---|---|---|
| JP | | 2000189529 A | 7/2000 | |
| JP | | 2002219185 A | 8/2002 | |
| KR | | 101730831 B1 | 4/2017 | |
| WO | WO-2013172828 A1 | * | 11/2013 | ............. A41D 13/11 |

OTHER PUBLICATIONS

IPO Search Report mailed Nov. 12, 2018, issued in corresponding Application No. GB 1808993.8, 4 pages.

Extended European Search Report mailed Oct. 2, 2019, issued in corresponding European Application No. EP 19170991, 8 pages.

* cited by examiner

FIG. 6

SPEECH DIAPHRAGM MODULE FOR A RESPIRATOR MASK

STATEMENT OF GOVERNMENT LICENSE RIGHTS

This invention was made with Government support under Contract No. N41756-14-C-3283 awarded by the Department of Defense. The Government has certain rights in the invention.

CROSS-REFERENCE TO RELATED APPLICATION

This application claims the benefit of Great Britain Application Number GB 1808993.8, filed Jun. 1, 2018, the disclosure of which is hereby incorporated by reference in its entirety.

FIELD

The present disclosure relates to respirator masks, and in particular to speech diaphragm modules to facilitate transmission of a user's speech when wearing a respirator mask.

BACKGROUND

It is known to provide respirator masks with means for assisting transmission of speech to aid close communication. Typically a respirator mask is provided with a speech diaphragm, i.e. a resilient membrane, that is vibratable by the sound waves associated with speech. The speech diaphragm may operate passively, i.e. may simply be a means for permitting or facilitating transmission of sound waves from an inner (sealed) volume to the surrounding environment. Such conventional passive devices can be relatively inefficient in sound transmission. It is therefore known to provide additional active assistance for speech transmission, e.g. in the form of microphones or other electroacoustic transducer systems which are arranged to amplify speech. Whilst such systems can be effective in improving speech transmission, they require additional components and manufacturing complexity. It is therefore desirable to provide a respirator mask with a more effective passive speech diaphragm module.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

At its most general, the present disclosure provides a passive speech diaphragm module in which a tensioning force is applied to a resilient film that forms the diaphragm independently of the means by which the film is secured within the module. The speech diaphragm module may be formed by sandwiching the film between two mating components, which the tensioning force is applied by the geometry of the components when mated. The components may be secured together by solid state welding, thereby obviating the need for additional attachment or sealing elements. The invention may thus provide a speech diaphragm module capable of cost-effective manufacture and assembly with a more effective passive speech transmission function.

According to one aspect, there is provided a speech diaphragm module comprising: a body; a lid secured to the body to form an enclosed volume therein; a resilient film secured within the enclosed volume along an attachment joint formed around a periphery of the resilient film; and a tensioning feature arranged to displace an operative portion of the resilient film relative to the attachment joint to apply a tension across the resilient film. The tensioning feature may be arranged to operate independently of the attachment joint. In other words, the tension across the operative portion of the resilient film (which may form a vibratable diaphragm in use) is primarily or solely created by displacement of the resilient film away from a position that it would naturally adopt once secured within the enclosed volume. This arrangement may facilitate manufacture and may mean the operative portion exhibit improved speech transmission performance.

The resilient film is attached to one of the body and the lid at the attachment joint. The tensioning feature is preferably provided on the other of the body and the lid. Thus, when the lid is mounted over the body, the tensioning feature is brought into engagement with the resilient film.

For example, the tensioning feature may be a protruding rib on an underside of the lid, the protruding rib being configured to engage the resilient film when the lid is secured to the body. In this case, the resilient film may be secured to the body at the attachment joint. The film and body may form a sub-assembly to which the lid is attached.

The enclosed volume may be cylindrical. The protruding rib may be a circle whose centre lies on an axis of the cylindrical enclosed volume. The rib therefore engages the resilient film at a ring around its surface. The protruding rib may lie radially inwardly of the attachment joint in order to engage and displace a portion of the resilient film that lies within the volume in order to provide the operative portion of the resilient film.

The module itself may have a generally cylindrical geometry. For example, the body and lid may form a cylindrical housing. The body may be configured for attachment to a respirator mask, e.g. via a snap-fit or bayonet connection that permit detachable mounting.

The enclosed volume may be configured to permit vibration of the operative portion of the resilient film to transmit sound (e.g. from speech), whilst preventing the resilient film from becoming too distorted in positive or negative pressure conditions. The body may comprise a cup-shaped portion, e.g. having upstanding side walls with a supporting wall spanning therebetween. The supporting wall may have a plurality of holes therein to facilitate transmission of sound whilst still enabling the supporting wall to limit excessive movement of the resilient film. The lid may be secured to the body to cover the cup-shaped portion to form the enclosed volume. The lid may also have a plurality of holes therethrough to facilitate transmission of speech.

The attachment joint may be a solid state weld joint between the resilient film and the body. The material of the resilient film and body may comprise a common material to facilitate provision of an effective joint. The solid state weld joint may provide a hermetic seal.

The lid may be secured to the body at a solid state weld joint. The lid and body may be formed from the same material to facilitate solid state welding. The weld joint between the lid and body may be separate from the weld joint between the resilient film and body, although this need not be essential. In one example, the solid state weld joint between the lid and body is formed outwardly from the attachment joint. The solid state weld joint between the lid and body may provide a hermetic seal. The weld joints discussed herein may be provided by ultrasonic torsional welding, although embodiments of the present disclosure need not be limited to this technique. The use of solid state welds may enable the total number of components required to manufacture the module to be reduced. For example, the module may comprise only three components: the lid, the body and the resilient film. Moreover, the solid state weld joints may provide hermetic seals between the components that means other sealing components are not needed.

In use, the speech diaphragm module may be mounted at the front of a respirator mask, where it will receive sound waves from a wearer's speech. The operative portion of the resilient film is a passive diaphragm arranged to facilitate transmission of the received sound waves through the mask.

The use of solid state welding in the manufacture of the speech module may be an independent aspect of the present disclosure. According to this aspect, there is provided a method of manufacturing a speech diaphragm module, the method comprising: mounting a resilient film over an opening into a cup-shaped portion of a body for the speech diaphragm module; welding the resilient film to the body at an attachment joint around a periphery of the resilient film; mounting a lid over a top surface of the body to enclose a volume containing the resilient film; welding the lid to the body at the weld joint around a periphery of the lid; and displacing, by a tensioning feature located within the enclosed volume, an operative portion of the resilient film relative to the attachment joint. The welding steps in this method may utilise a solid state welding technique, such as ultrasonic torsional welding. The speech diaphragm module manufactured by the method may have any one or more of the features discussed above. For example, the tensioning feature may be a protruding rib on an underside of the lid, whereby the operative portion of the resilient film is displaced upon mounting the lid over the top surface of the body.

In another aspect, there is provided a kit of parts for forming a speech diaphragm module, the kit comprising: an assembly comprising a body and a lid securable to the body to form an enclosed volume; and a resilient film securable within the enclosed volume at an attachment joint around a periphery of the resilient film, wherein the assembly comprises a tensioning feature arranged to displace an operative portion of the resilient film relative to the attachment joint to apply a tension across the resilient film. The speech diaphragm module that can be formed from this kit may have any one or more of the features discussed above.

DESCRIPTION OF THE DRAWINGS

Embodiments of the invention are described in detail below with reference to the accompanying drawings, in which.

DETAILED DESCRIPTION; FURTHER OPTIONS AND PREFERENCES

Figure 1:
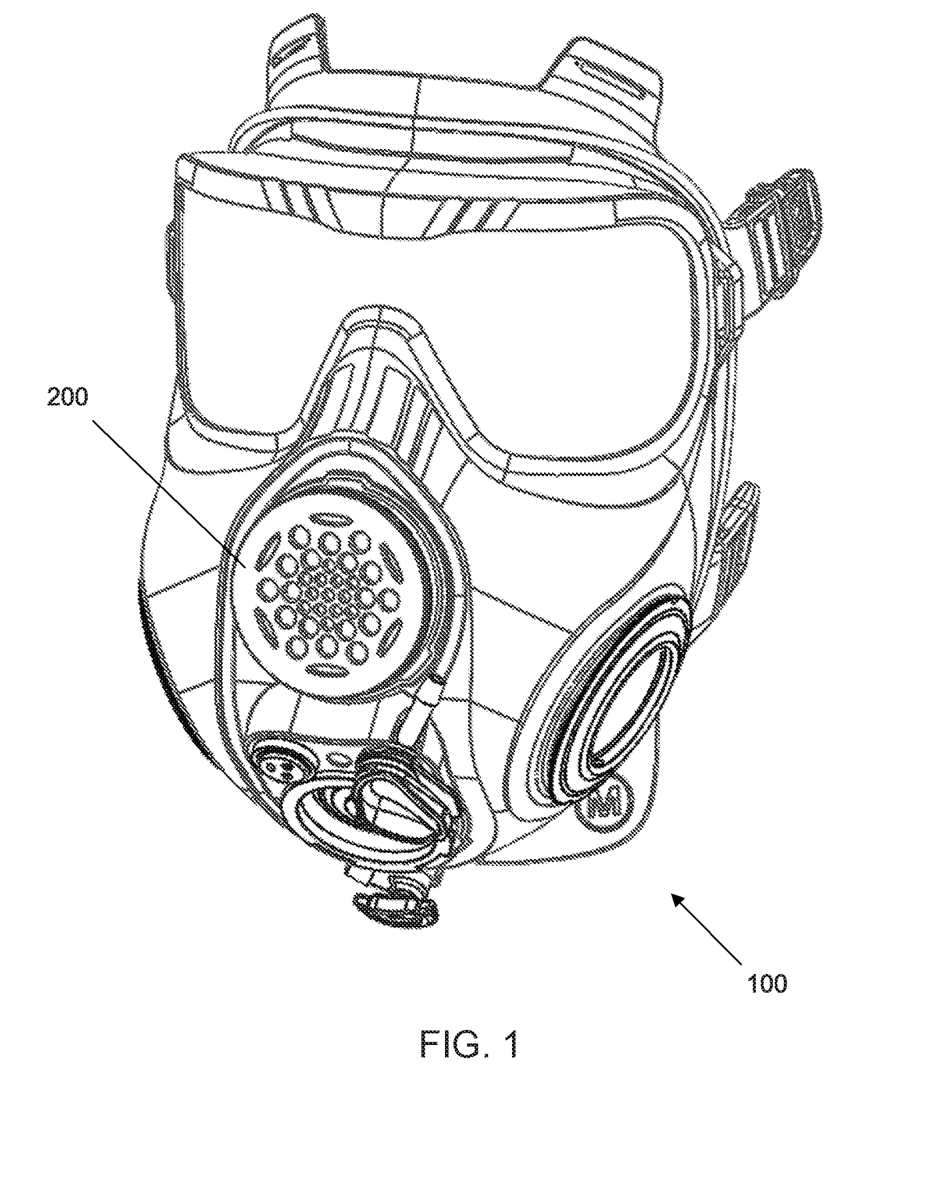
FIG. 1 is a view of a respirator mask with outer covering removed to show a typical mounting location for a speech diaphragm module that is an embodiment of the present disclosure.

The present disclosure relates to a passive (i.e. non-powered) speech diaphragm module for a respirator mask. FIG. 1 shows an example of a respirator mask 100 with which a speech diaphragm module 200 that is an embodiment of the present disclosure can be used. In FIG. 1, an outer cover of the respirator mask 100 is not shown so that the underlying components, including the speech diaphragm module 200, are visible.

As is conventional, the respirator mask 100 comprises a visor (eye protection) and inhalation and exhalation valves. The speech diaphragm module 200 may be mounted centrally on the mask below the visor to facilitate transmission of sound waves from speech.

Figure 2:
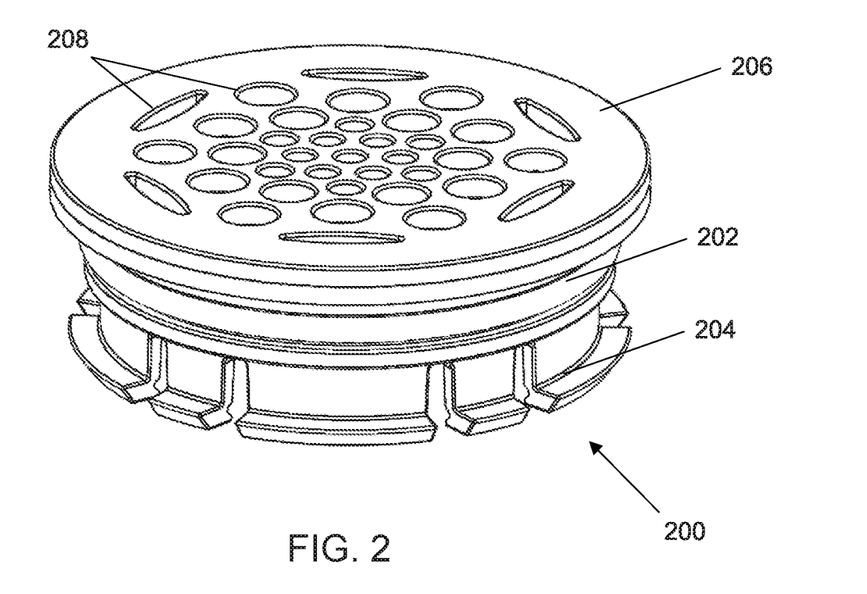
FIG. 2 is a perspective view of a speech diaphragm module that is an embodiment of the present disclosure.

FIG. 2 shows a perspective view of the speech diaphragm module 200 itself. The speech diaphragm module 200 may be a replaceable component for the respirator mask, i.e. it may be configured to be detachably mounted on the mask. The speech diaphragm module 200 comprises a body 202 with a lid 206 mounted thereon. In this example the body 202 is generally cylindrical, although other shapes can be used. The body 202 comprises an upper cup-shaped portion that defines a volume within which a resilient diaphragm (e.g. a tensioned film as discussed below) can vibrate to transmit sound. The body 202 comprises a lower skirt portion 204 that depends from the cup-shaped portion, e.g. around an outer periphery thereof. The skirt portion 204 is configured, e.g. with a radial flange, to be engagable with the respirator mask, e.g. via corresponding engagement features formed on the mask.

The lid 206 is mounted over the cup-shaped portion to enclose (i.e. provide a top surface for) the volume. As discussed below, the body 202 and lid 206 cooperate both to secure the resilient diaphragm within the volume, e.g. around its periphery, and to apply tension across the surface of the diaphragm. The means by which tension is applied is separate from and operates independently to the connection that secures the diaphragm in place. The tension in the diaphragm may thus be applied in a more predictable and repeatable manner, which aids efficient manufacture and assembly.

The lid 206 has a plurality of holes 208 fabricated therethrough to facilitate transmission of sound from vibration of the diaphragm. The holes may have any suitable pattern that assists in transmission of speech frequencies. The hole pattern may be rotational symmetrical, as in the example shown. The plurality of holes 208 may have different sizes and shapes, as is conventional.

Figure 3:
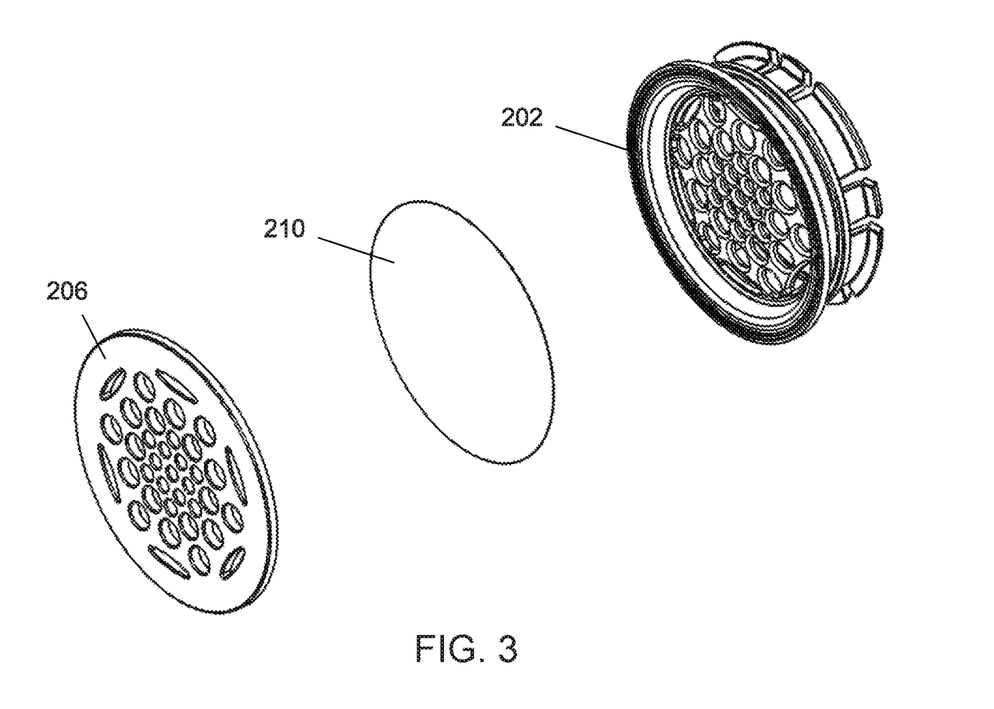
FIG. 3 is an exploded view showing components of the speech diaphragm module of FIG. 2.

FIG. 3 is an exploded view of the components of the speech diaphragm module 200. In this example there are three components: the body 202, the lid 206, and a resilient diaphragm, which is also referred to herein as a film 210. The body 202 and lid 206 may be moulded components, e.g. formed from a suitable polymer material, having a structural strength selected to ensure that the speech diaphragm module 200 is robust.

As discussed below, the components of the speech diaphragm module discussed herein can be secured together by a solid state welding technique, such as ultrasonic welding. The material for the components may thus be selected to be compatible with the welding technique that is used. In one example, the body 202 and lid 206 are made of glass-filled polyethylene terephthalate (PET).

The film 210 may also be made from the same base material as the other components, e.g. PET, but in a form that exhibits the resilience (e.g. elasticity) required to be tensioned as discussed below. The film 210 may have a thickness selected to optimise a balance between its force displacement characteristic (which is indicative of how well it transmits sound waves) and its impermeability to unwanted airborne agents (e.g. chemical, biological, radiological or nuclear, CBRN, agents). In one embodiment, the film is made from Melinex 401, and has a thickness of 50 µm.

In this example, the speech diaphragm module is assembled in a two-stage process. In a first step, the film 210 is positioned over an opening to the cup-shaped portion of the body and welded to the body 202 at an attachment joint formed around its periphery. In a second step, the lid 206 is positioned over the film/body assembly and welded to the body 202 around its periphery. In the cylindrical geometry shown in FIG. 3, both welds are therefore circular joins around the circumference of the relevant components. The second weld may be located radially outwardly of the first weld. The two welds ensure that the interior of the speech diaphragm module (i.e. the volume enclosed within the cup-shaped portion) is hermetically sealed.

The welding technique used may be ultrasonic torsional welding. Welding the film 210 to the body 202 using this technique can introduce some tension into the film 210, i.e. to stretch it over the opening into the cup-shaped portion. However, as discussed below, the film 210 is brought into its operational tension by a tensioning feature that is brought into engagement with the film 210 when the lid 206 and body 202 are welded together. In this example, the tensioning feature is a rib that protrudes downwardly from an underside of the lid 206. The rib extends around the periphery of the portion of the lid that faces into the enclosed volume. The rib therefore engages with the film 210 around its edge. This acts to provide a radially tensioned operative portion of the film, e.g. a central portion of the film in the form of a stretched diaphragm. Herein "operative portion" may mean a tensioned area of the film that is configured to transmit sound waves, i.e. is vibratable by speaking through the enclosed volume.

Although in this example the rib is on the lid, which is mounted on the body after the film is already in place, it can be understood that it is also possible to mount the film on the lid first. In this scenario, the tensioning feature may be an upstanding rib on the body, which is brought into engagement with the film when the body is mounted on the lid/film assembly.

The tension applied to the film by the tensioning feature is independent of both welds. The nature of the tension is primarily governed by the geometry of the assembly, i.e. how much the rib protrudes below an engagement surface (welded junction) of the lid and body, and the material of the film. This is advantageous in terms of repeatability and efficient process control in manufacture.

Figure 4:
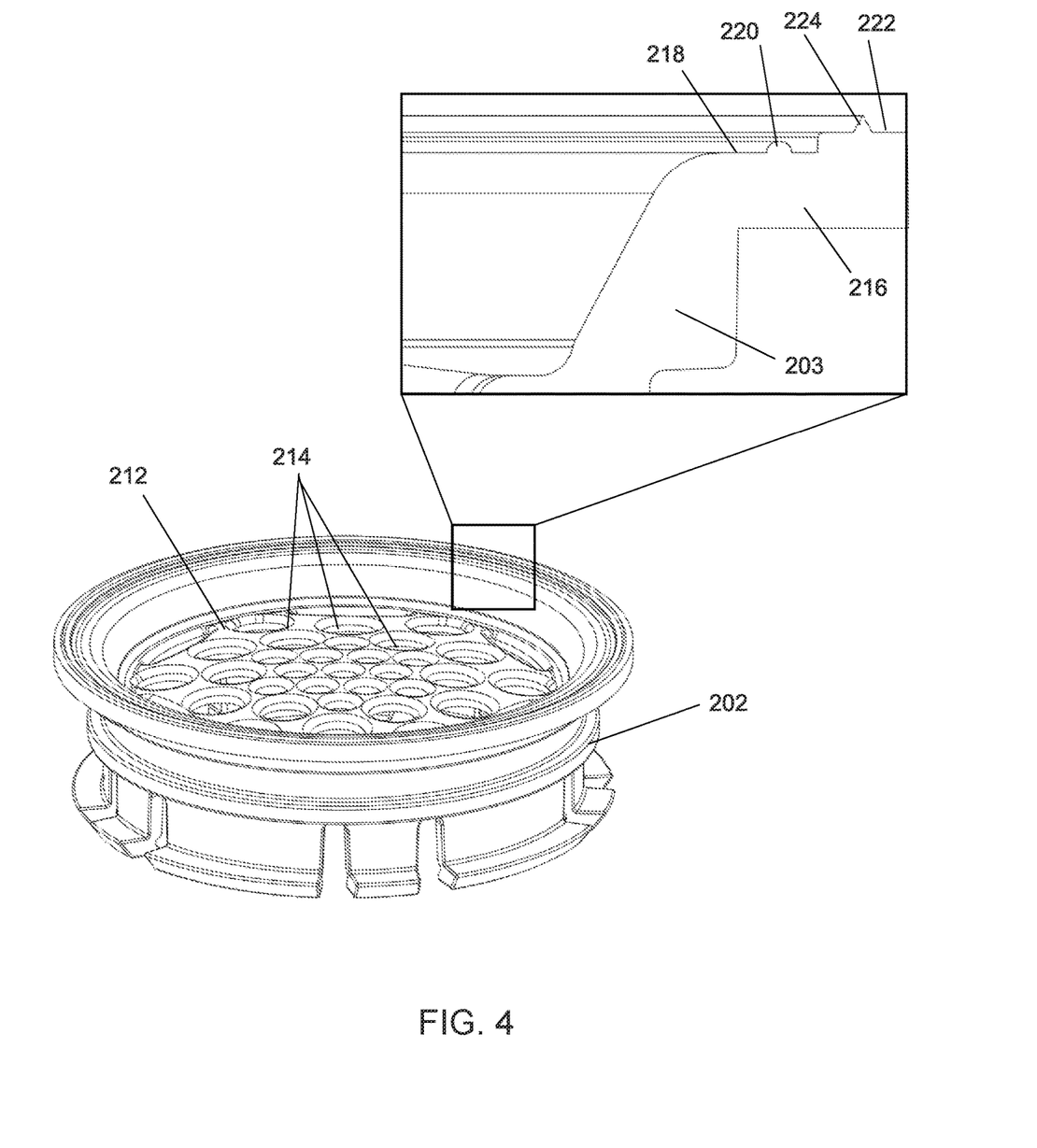
FIG. 4 is a perspective and close-up partial cross-sectional view of a body for the speech diaphragm module of FIG. 2.

FIG. 4 is a perspective view of the body 202 that includes a magnified cross-sectional view through a wall of the cup-shaped portion. The body 202 has a supporting wall 212 that spans across the bottom of the cup-shaped portion. A plurality of holes 214 are formed through the supporting wall to facilitate transmission of sound waves. The plurality of holes 214 may have a pattern that corresponds to or is identical to the pattern of holes 208 in the lid 206. The supporting wall 212 prevents collapse of the diaphragm under negative pressure operations.

Turning to the cross-sectional view, the body 202 comprising an upstanding circumferential wall 203 that defines the sides of the cup-shaped portion. A radial flange 216 is disposed at a top end of the wall 203. The top surface of the flange 216 has a stepped configuration that provides engagement surfaces for the film 210 and lid 206 respectively.

A first engagement surface 218 is provided around an inner peripheral portion of the top surface of the radial flange 216. The first engagement surface 218 includes a first weld bead 220 to assist in forming a solid state weld joint to the film 210. The film 210 may have a size (e.g. diameter or area) selected to correspond to the first engagement surface 218, e.g. so that an edge of the film 210 can be located against the step in the top surface of the radial flange 216. This may assist in rapid and repeatable location of the film 210 during manufacture.

A second engagement surface 222 is provided around an outer peripheral portion of the top surface of the radial flange 216. The second engagement surface 222 includes a second weld bead 224 to assist in forming a solid state weld joint to the lid 206. The lid 206 may have a size (e.g. diameter or area) that corresponds to the radial flange, e.g. so that an edge of the lid 206 is aligned with (i.e. flush with) a side surface of the radial flange 216 when assembled.

Figure 5:
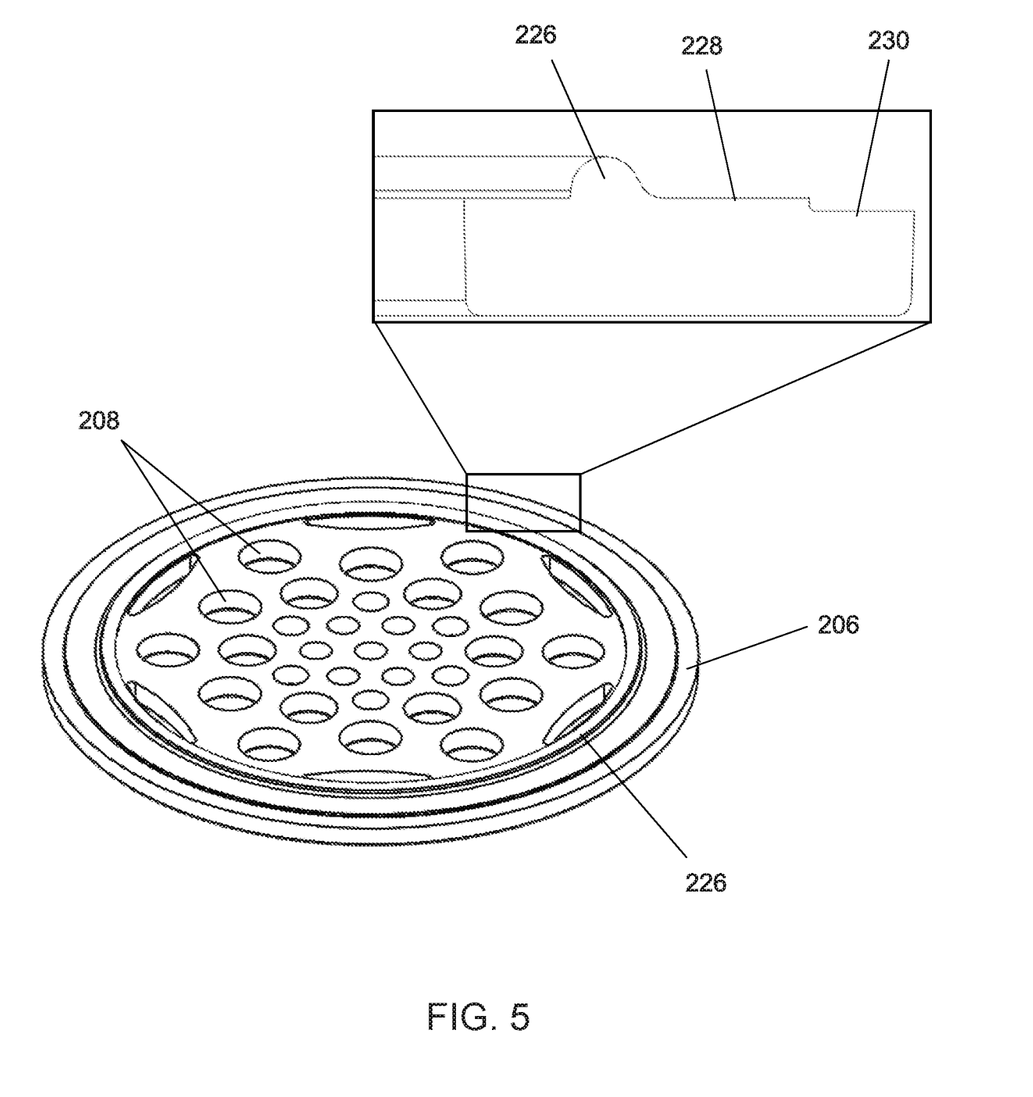
FIG. 5 is a perspective and close-up partial cross-sectional view of an underside of a lid for the speech diaphragm module of FIG. 2.

FIG. 5 is a perspective view on an underside of the lid 206 that includes a magnified cross-sectional view through an peripheral portion thereof. As discussed above, the lid 206 provides a wall that spans over the opening to the cup-shaped portion of the body 202 to enclose a volume therein for retaining the film 210. A plurality of holes 208 are formed in the wall, which provides a physical limit to prevent unwanted inflation of the film under positive pressure operation.

The underside of the lid 206 comprises a pair of stepped engagement surfaces around its periphery that are configured to engagement regions of the film/body assembly that correspond to the first engagement surface 218 and second engagement surface 222 discussed above. As shown in the cross-sectional view in FIG. 5, the periphery of the lid 206 comprises a first contact surface 228 for abutting the part of the film 210 that covers the first engagement surface 218. The lid 206 comprises a second contact surface 230 located outwardly from the first contact surface 228. The second contact surface 230 is arranged to abut the second engagement surface 222 in order to be welded thereto. The second contact surface 230 may include a weld bead in addition to or in place of the weld bead 224 on the second engagement surface 222.

The lid 206 further comprises a displacement rib 226 located inwardly (e.g. radially inwardly) of the first contact surface 228. The displacement rib 226 protrudes from the underside of the lid beyond the first and second contact surfaces 228, 230 to engage the film 210. As the lid 206 is mounted on the body 202, the displacement rib 226 operates as a tensioning feature to stretch the film 210 into the volume defined by the cup-shaped body away from its joint at the first engagement surface 218.

Figure 6:
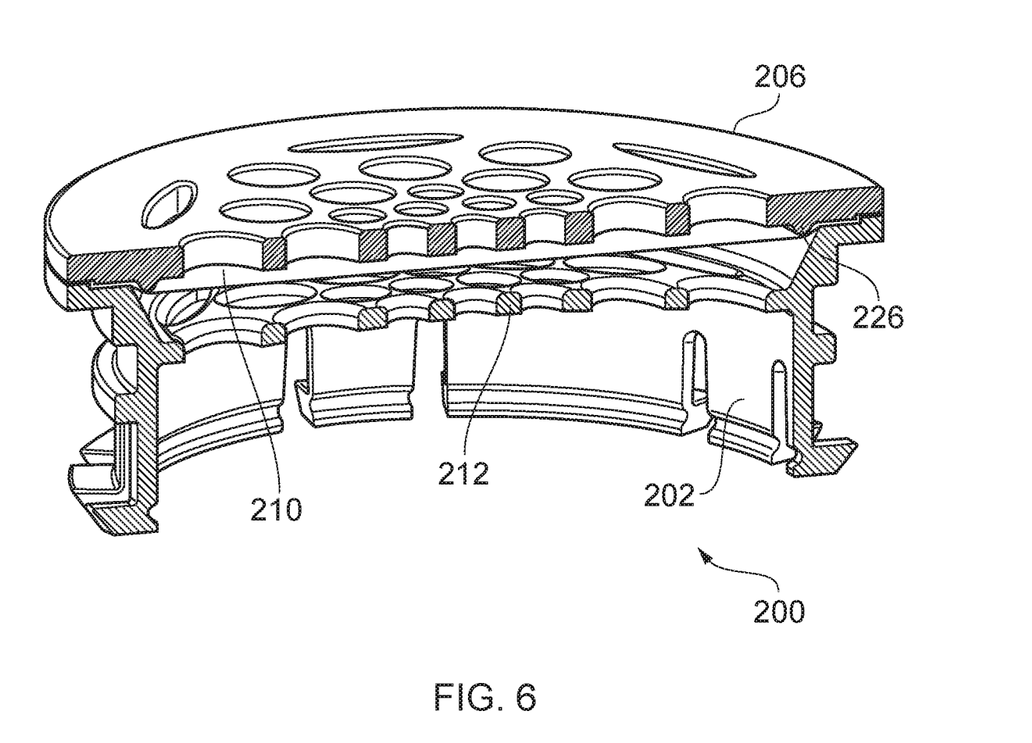
FIG. 6 is a cut-away perspective view of the speech diaphragm module of FIG. 2 after assembly.

FIG. 6 is a cut-away perspective view through the speech diaphragm module 200 when fully assembled. The lid 206 is attached to the body 202 at the radial flange, whereby the film 210 is sandwiched therebetween in a volume defined between the supporting wall 212 of the body and the underside of the lid 206. The displacement rib 226 pushes a peripheral portion of the film 210 downwards into the volume, which applies a radial tension across the film to optimise speech transmission.

The National Fire Protection Association (NFPA) standard 1986:2017 includes a measurement technique for respirator speech transmission index, which allows comparison between different devices. Conventional speech diaphragm modules typically generate a range of speech transmission index values in a range around 0.45-0.65. In contrast, the configuration of a speech diaphragm module discussed above exhibits a demonstrable improvement in speech transmission index to around 0.8.

The embodiments of the invention in which an exclusive property or privilege is claimed are defined as follows:

1. A speech diaphragm module, comprising:
 a body;
 a lid secured to the body to form an enclosed volume therein;
 a resilient film secured within the enclosed volume along an attachment joint formed around a periphery of the resilient film, wherein the attachment joint is a solid state weld joint between the resilient film and the body to apply a first tension across the resilient film; and
 a tensioning feature arranged to displace an operative portion of the resilient film relative to the attachment joint to apply a second tension across the resilient film, wherein the second tension is greater than the first tension.

2. A speech diaphragm module according to claim 1, wherein the tensioning feature is a protruding rib on an underside of the lid, the protruding rib being configured to engage the resilient film when the lid is secured to the body.

3. A speech diaphragm module according to claim 2, wherein the enclosed volume is cylindrical, and wherein the protruding rib is a circle whose center lies on an axis of the cylindrical volume.

4. A speech diaphragm module according to claim 3, wherein the protruding rib lies radially inwardly of the attachment joint.

5. A speech diaphragm module according to claim 1, wherein the body and lid form a cylindrical housing.

6. A speech diaphragm module according to claim 1, wherein the body comprises a cup-shaped portion, and wherein the lid is secured to the body to cover the cup-shaped portion to form the enclosed volume.

7. A speech diaphragm module according to claim 1, wherein the lid is secured to the body at a solid state weld joint.

8. A speech diaphragm module according to claim 7, wherein the solid state weld joint between the lid and body is formed outwardly from the attachment joint.

9. A speech diaphragm module according to claim 1, wherein the lid has a plurality of holes formed therethrough.

10. A speech diaphragm module according to claim 1, wherein the body comprises a supporting wall that spans across a bottom face of the enclosed volume.

11. A speech diaphragm module according to claim 10, wherein the supporting wall has a plurality of holes formed therethrough.

12. A method of manufacturing a speech diaphragm module, the method comprising:
 mounting a resilient film over an opening into a cup-shaped portion of a body for the speech diaphragm module;
 welding the resilient film to the body at an attachment joint around a periphery of the resilient film to apply a first tension across the resilient film, wherein the attachment joint is a solid state weld joint;
 mounting a lid over a top surface of the body to enclose a volume containing the resilient film;
 welding the lid to the body at weld joint around a periphery of the lid; and
 displacing, by a tensioning feature located within the enclosed volume, an operative portion of the resilient film relative to the attachment joint to apply a second tension across the resilient film, wherein the second tension is greater than the first tension.

13. A method according to claim 12, wherein the tensioning feature is a protruding rib on an underside of the lid, whereby the operative portion of the resilient film is displaced upon mounting the lid over the top surface of the body.

14. A method according to claim 12, wherein the welding is ultrasonic torsional welding.

15. A method according to claim 12, wherein the weld joint between the lid and the body is formed outwardly of the attachment joint.

16. A kit of parts for forming a speech diaphragm module, the kit comprising:
 an assembly comprising a body and a lid securable to the body to form an enclosed volume; and
 a resilient film securable within the enclosed volume at an attachment joint around a periphery of the resilient film by a solid state weld joint to apply a first tension across the resilient film,
 wherein the assembly comprises a tensioning feature arranged to displace an operative portion of the resilient film relative to the attachment joint to apply a second tension across the resilient film, and wherein the second tension is greater than the first tension.

* * * * *